INVENTOR.
Ernest E. Wemp

INVENTOR.
Ernest E. Wemp

Patented June 10, 1947

2,422,155

UNITED STATES PATENT OFFICE 2,422,155

CLUTCH AND CLUTCH OPERATING MECHANISM

Ernest E. Wemp, Detroit, Mich.

Application July 4, 1945, Serial No. 603,183

12 Claims. (Cl. 192—105)

1

This invention relates to a clutch and operating mechanism associated with the clutch, and particularly a clutch for use with internal combustion engines in automotive vehicles although the invention may be employed in places other than in vehicles.

It is the aim of the invention to provide an improved combination of operating elements which embodies a centrifugal clutch. Generally speaking, a centrifugal clutch for use in automotive vehicles is one which is disengaged when the engine is at its normal idling speed which, for present day engines, is about 500 or 600 R. P. M. As the engine is accelerated, the clutch becomes centrifugally engaged and then it disengages again when the engine decelerates. The exact R. P. M. of engagement and disengagement may vary and is preferably at an R. P. M. somewhat higher than normal engine idling speed. Thus, the clutch is of an automatic nature.

One difficulty with such a clutch, however, is that it does not provide the desired operation under certain engine conditions as, for example, when the engine is cold and requires a relatively high speed of operation in order to keep it running. Such a condition may be termed one having or requiring a high idling R. P. M. Under these conditions an ordinary centrifugal clutch becomes engaged. This is an improper condition because the clutch does not disengage in order to permit the change of gearing in the usual gear shift transmission nor can the vehicle remain standing with the transmission in gear.

One object of the invention is to provide an arrangement where a proper automatic centrifugal action may be obtained under both the condition where the engine is normally functioning under the usual idling conditions and under the conditions where high idling speeds are required. A further object of the invention is to provide an arrangement for supplementing the centrifugal action and in which the supplementing means constitutes part of the mechanism for providing or establishing a condition which permits of the high idling. These and other objects will be better appreciated as the following detailed description is considered, and one structure made in accordance with the invention is disclosed in the accompanying drawings.

Fig. 2 is a view similar to Fig. 1 showing the

2 centrifugal clutch engaged and with the pressure supplementing means in action.

Figure 2:
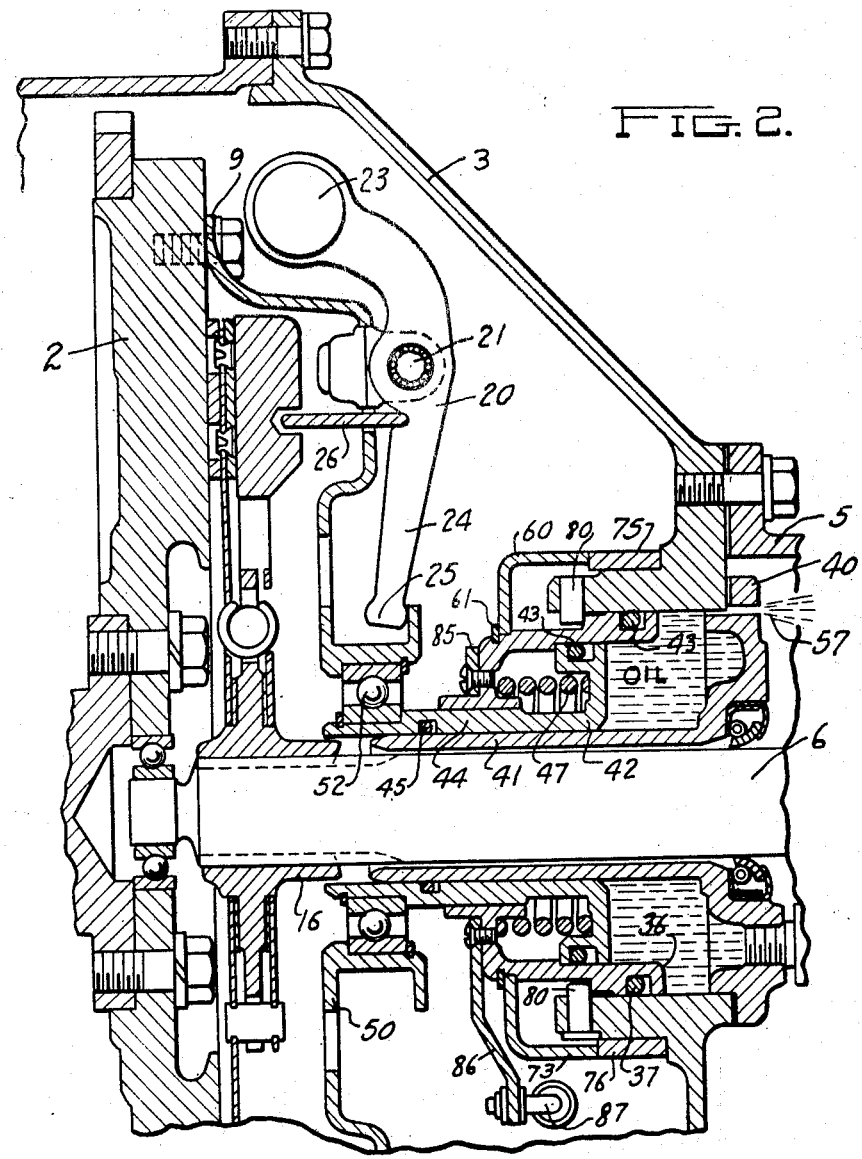
Figure 3:
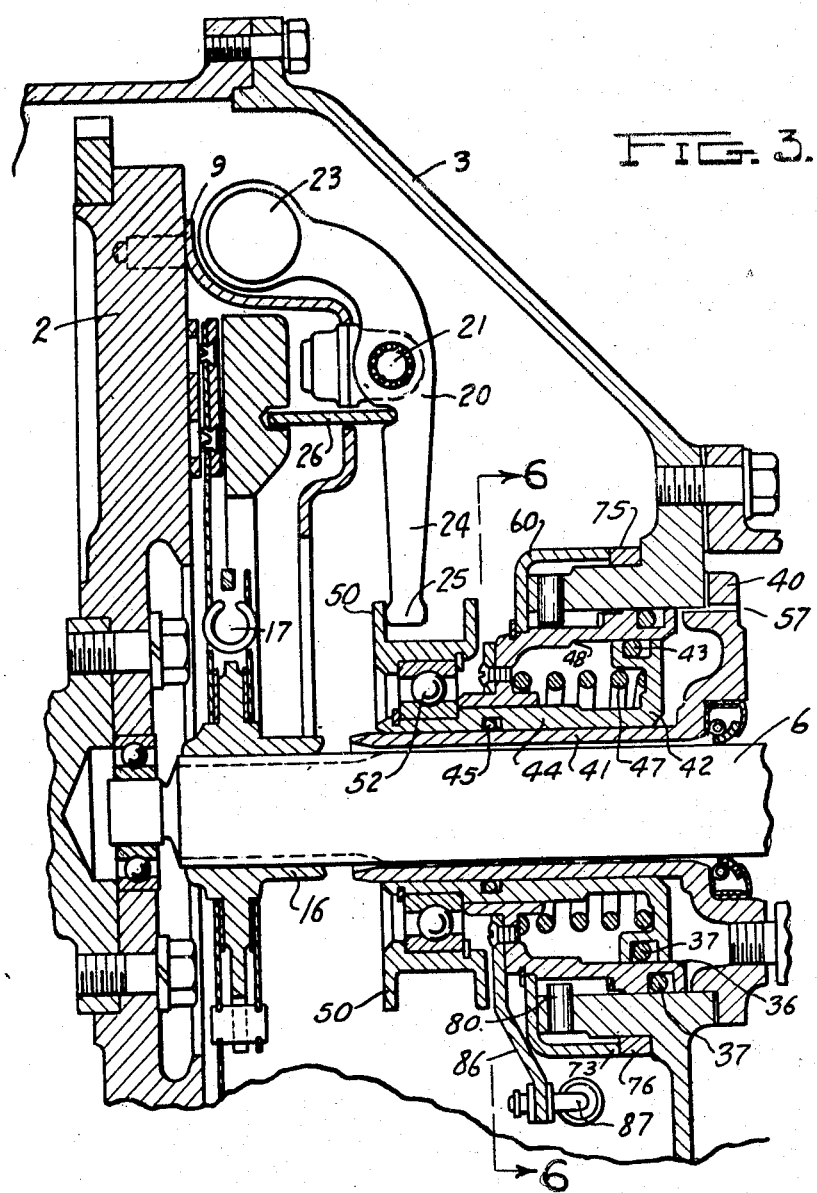

Fig. 3 is a sectional view similar to Fig. 2 showing the parts in position for providing the high idle condition.

Figure 1:
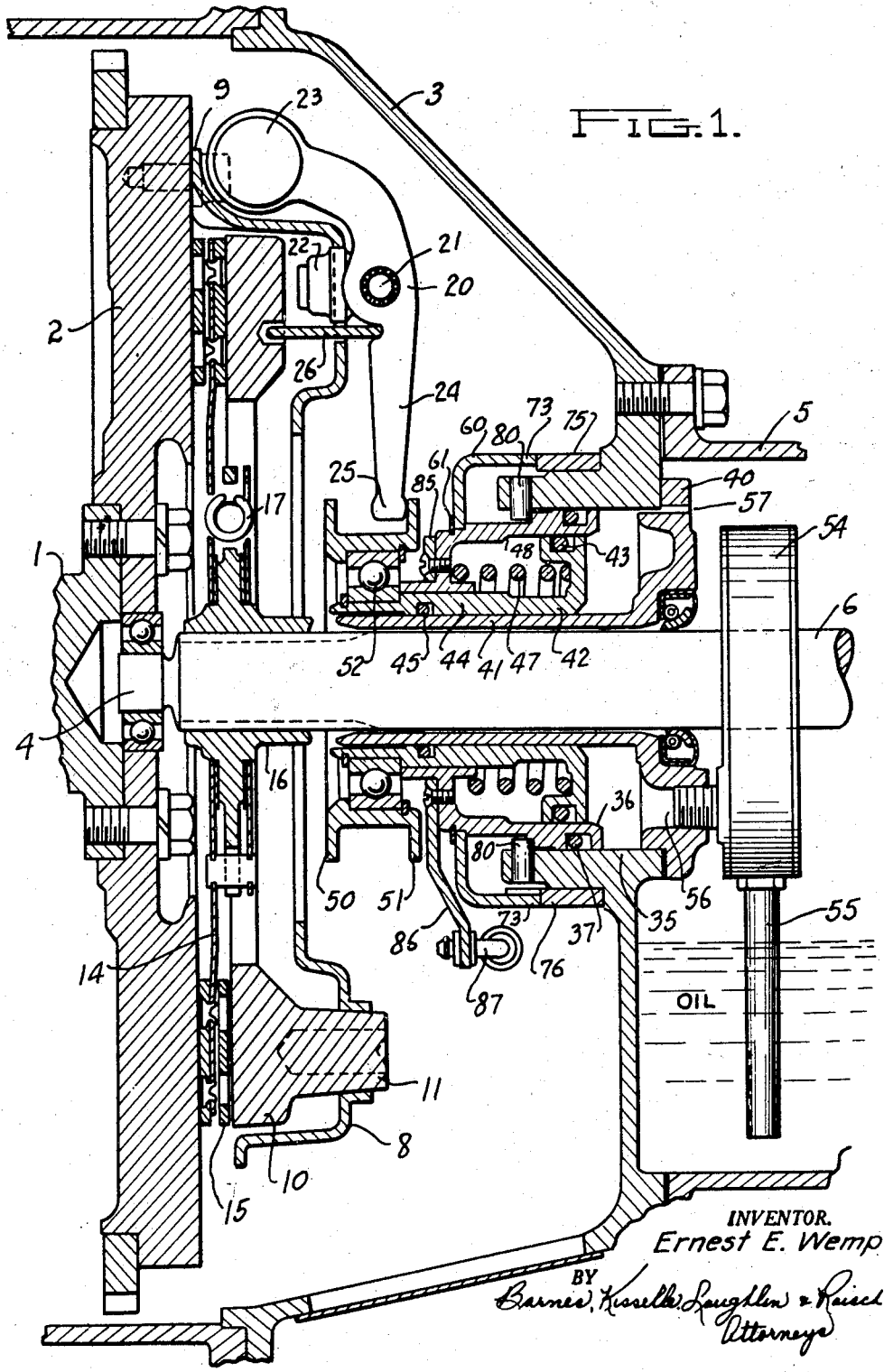
Fig. 1 is a sectional view taken through a centrifugal clutch structure and illustrating control mechanism for supplementing the centrifugal force for engaging the clutch and mechanism for establishing the high idling condition.
Figure 4:
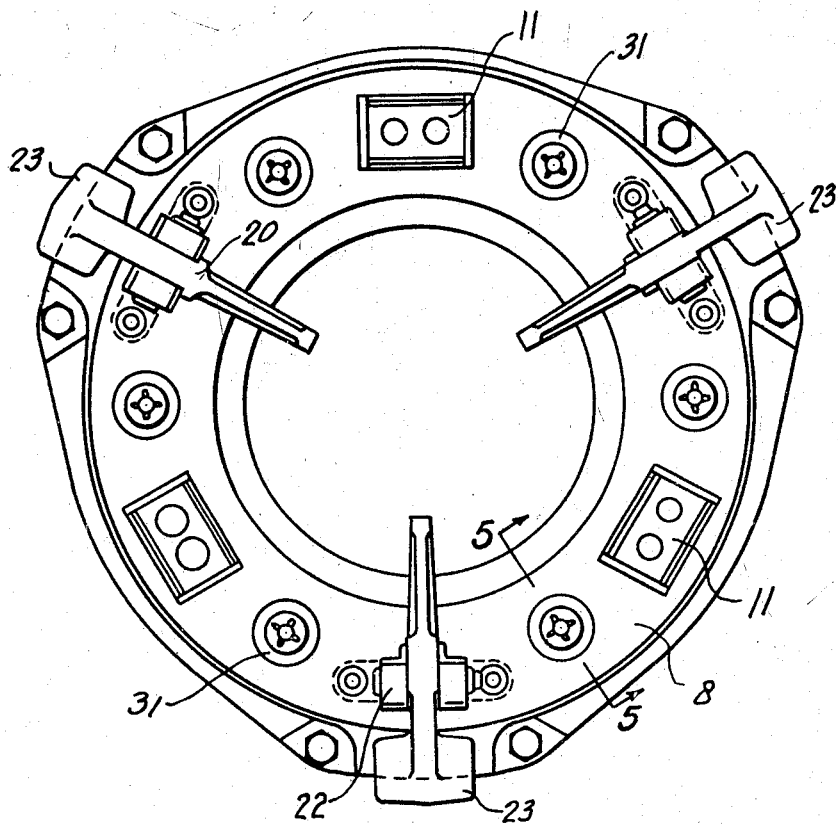

Fig. 4 is a rear elevational view of the clutch, the figure being ensmalled relative to Figs. 1, 2 and 3.

Figure 5:
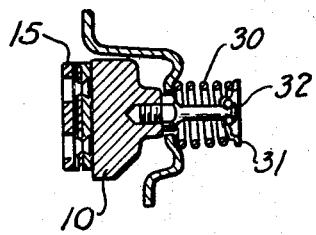

Fig. 5 is a sectional view taken substantially on line 5—5 of Fig. 4 showing a retractor spring.

Figure 6:
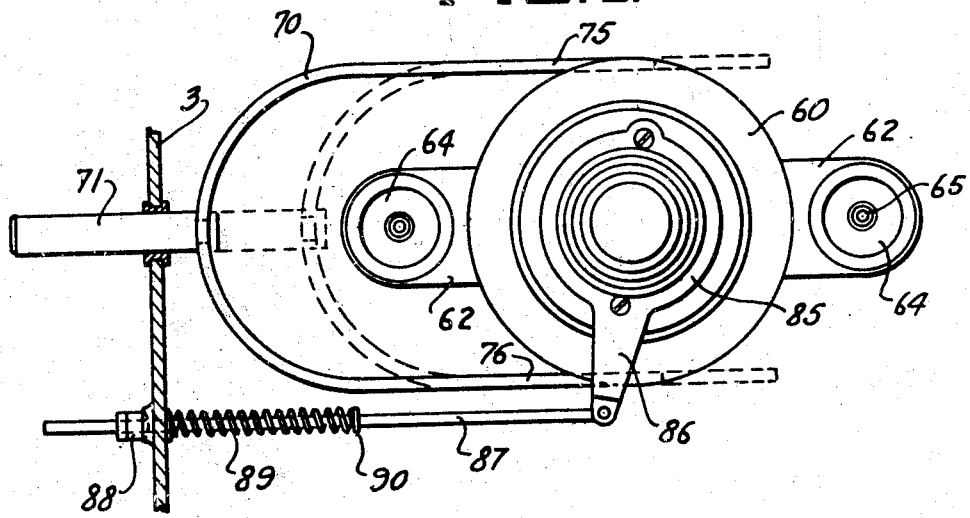

Fig. 6 is a view of some of the control means looking in the direction of line 6—6 of Fig. 3.

Figure 7:
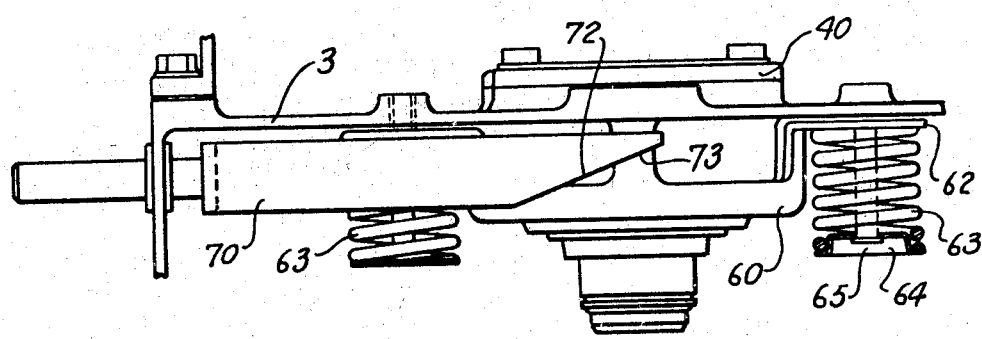

Fig. 7 is a top plan view of the mechanism shown in Fig. 6.

Figure 8:
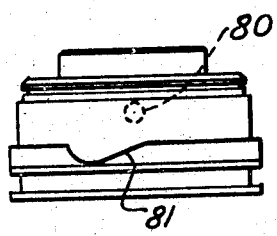

Fig. 8 is a detailed view of a control sleeve showing an arrangement for adjusting the mechanism for wear of the clutch facings.

The crank shaft of an engine is illustrated at 1, attached to which is a fly wheel 2 disposed within a clutch housing 3. A clutch driven shaft 6 has one end piloted in the fly wheel as at 4 and it extends into a casing or housing which is shown at 5 and to a suitable transmission (not shown). The clutch comprises a suitably formed cover plate 8 attached to the fly wheel as at 9 and within the cover plate is a pressure plate 10. The pressure plate has lugs 11 which are in sliding and driving relationship with the cover plate.

A suitable driven disc or driven member of the clutch is shown at 14 having facings 15 disposed between the face of the fly wheel and the pressure plate 10. The driven disc is attached to a hub 16 mounted in driving relationship on the driven shaft 6 and the connection between the driven disc and the hub is preferably of the vibration dampening type, which structure is generally illustrated at 17.

There are a plurality of levers, each of which is illustrated at 20 and each is fulcrumed on the cover plate as at 21 through the means of a suitable bracket 22. Each lever is fashioned with a weighted end 23 which may be shaped so as to normally overlie a peripheral portion of the cover plate and an inwardly extending lever arm 24 with a tip 25. There is a strut 26 which passes through the cover plate and engages the lever and the pressure plate. The pressure plate is normally held retracted by a plurality of coiled springs shown in Fig. 5. Each coiled spring 30 seats upon the cover plate and acts upon a washer 31 which is connected to the pressure plate by a stud 32. When the clutch is at rest and during normal idling of the engine, the retractor springs 30 retract the pressure plate and through the struts 26 hold the levers in the position shown in Fig. 1 with the clutch disengaged. As the engine and clutch are accelerated the centrifugal force exerted by the weighted ends 23 rocks the levers on their pivots. The lever as viewed in Fig. 1 would rock clockwise upon its fulcrum and the pressure plate urged to the left so that the driven disc facings are packed between the pressure plate and the fly wheel to engage the clutch.

Preferably the clutch is relatively lightly weighted as this promotes a smooth clutch action and the clutch may be so arranged that the centrifugal force is inadequate for transmitting maximum engine torque until the R. P. M. is about 2400.

The housing 3 may be formed with a cylindrical extension 35 which, in effect, constitutes a cylinder in which is disposed a sleeve 36 which at times acts as a piston, and the sleeve is preferably grooved to receive an O-ring 37 which engages the walls of the cylinder for sealing purposes. The cylinder is closed by a head 40 which has an extension 41 and upon which is mounted a piston 42. There is preferably an O-ring 43 for providing a seal between the piston and the sleeve. The piston has a sleeve or extension 44 sliding over the extension 41 and there is preferably an O-ring seal 45 between the sleeve and the extension. An auxiliary retractor spring 47 is disposed between the piston and the sleeve, and the sleeve has an internal shoulder 48 against which the piston, at times, abuts.

Mounted on the end of the piston sleeve is a channel-shaped or grooved control ring for the clutch levers, this control ring having what may be termed a forward wall 50, a rear wall 51 and the lever tips 25 lie within the channel between these walls. This control ring is preferably mounted on the piston sleeve through the means of an antifriction bearing 52. Suitable pumping means for pumping a liquid into the cylinder is arranged to be operated by mechanism which is driven by the clutch. As shown in Fig. 1, there is a pump having a housing 54 and the mechanism of this pump (not shown) is operated by the driven shaft 6. The pump has an inlet tube 55 which extends downwardly into a suitable liquid, such as oil, in the sump provided by the housing 5, and the outlet of the pump is connected into the cylinder, as shown at 56. There is preferably a bleed port 57 in the head 40 at the top of the cylinder so that any air or other gas trapped therein is forced from the cylinder, and while this bleed port constitutes a loss of liquid when the same is pumped into the cylinder the pump has adequate capacity to more than take care of the loss.

The sleeve 36 is connected to a shiftable controlling element or bracket 60. This controlling element may be a stamping with a central aperture through which the sleeve extends, the attachment being by means of a snap ring or the like, as shown at 61, and the stamping has oppositely disposed feed or extensions 62 (Fig. 7). The control member 60 is acted upon by coiled springs 63 which seat upon the extensions 62 and react against the caps 64 held by studs 65 secured to the back wall of the housing 3. It will be seen that the control element 60 may be shifted away from the wall of the housing 3 by compression of the springs 63.

Other control means is provided for determining the position of the element 60 and, as shown in Figs. 6 and 7, this takes the form of a yoke 70 having arms 75 and 76 provided with a stud 71 which projects out through the housing and to which may be attached any suitable device for manipulation by the operator. The two legs of this yoke are provided each with a cam surface 72 which engage inclined surfaces 73 on the member 60. These points of engagement are preferably opposite and located substantially in line with the axis of the driven shaft.

The movements of the control bracket 60 are transmitted to the sleeve 36 through the connection at 61, but the movement of the sleeve 36 is further limited and controlled by means of studs 80 carried by the housing 3. The sleeve is formed with abutting faces 81 positioned to engage the studs 80 when the sleeve is urged to the left as Figs. 1, 2 and 3 are viewed, and these faces 81 are inclined, as shown in Fig. 8, to serve as adjusting agencies. The adjustment is accomplished by rotating the sleeve through the means as shown in Fig. 6. A control member 85 is secured to the sleeve by screws, as shown, and it has an arm 86 connected to which is an adjusting rod 87 that extends out through the housing wall 3 and is provided with screw threaded adjusting nuts 88. A coiled spring 89 surrounds a rod 87 and reacts against the housing and against a washer 90 on the rod. By adjusting the screw threaded nuts 88 the rod 87 is urged axially one way or the other depending upon the direction the nuts are turned and this imparts rotary movement to the sleeve 36. The rotary movement of the sleeve shifts the cam surfaces 81 relative to the studs 80 and thus the position of the sleeve when stopped against the studs 80 can be varied. The member 60 oscillates at the connection 61.

The operation of the construction is as follows: The general function or operation of the centrifugal clutch has already been described. The parts are shown in Fig. 1 in a position of normal rest or of normal engine idling. The clutch here is disengaged and the lever tips 25 are adjacent to or may even contact with the rear wall 51 of the control channel. At this time the control yoke 70 is shifted inwardly to the dotted-line position shown in Fig. 6. This moves the control bracket 60 away from the rear wall of the housing and compresses the springs 63, and accordingly the sleeve 36 is held in a relatively forward position, as shown in Fig. 1. As the engine is accelerated the centrifugal clutch becomes engaged and the lever tips 25 swing forwardly into position adjacent the forward wall 50 of the control channel. The control channel has sufficient width so that the clutch may completely engage under centrifugal force. The engagement of the clutch starts operation of the driven shaft 6 and the pump 54, whereupon the liquid is pumped into the cylinder. At this time the sleeve 36 is held in its forwardmost position and the cam surfaces 81 abut against the studs 80. As the liquid is pumped into the cylinder the piston 42 is shifted forwardly or to the left, as Fig. 2 is viewed, carrying with it the control channel. The rear wall 51 of the channel engages the lever tips 25 and applies a force thereon which supplements the clutch packing pressure. In this way the packing pressure of the relatively lightly weighted centrifugal clutch is supplemented to provide the necessary torque capacity. As the engine decelerates the centrifugal force lessens, the retractor springs 30 retract the pressure plate, the oil pressure lowers and the clutch becomes disengaged and the parts are restored to the position shown in Fig. 1. The above conditions constitute the normal operation and it is well appreciated by those skilled in the art how the gear shift transmission may be manipulated and a vehicle operated with a clutch action of this kind.

When it is necessary that the engine operate at a high idling speed, as for example when it is cold, the control yoke 70 is shifted to the full-line position shown in Figs. 6 and 7 and the parts are now relatively positioned, as shown in Fig. 3. As the springs 63 urge the bracket 60 against the rear wall of the housing 3, the spring 47 urges the piston in the same direction or to the right, as Fig. 3 is viewed. This brings the flange 50 in position to engage the lever tips. This shift of the parts places, in effect, the auxiliary spring 47 into the clutch retractor spring system; in order for the clutch to engage centrifugally, the weights now have to overcome both the restractor springs 30 and the spring 47 because as the levers shift under centrifugal force the piston must be pulled to the left, as Fig. 3 is viewed. Therefore, the engine may attain a higher R. P. M. before the clutch engages. Accordingly, the engine may idle at a higher R. P. M. with the clutch disengaged. The strength of the spring 47 may be selected with due consideration to the weight system of the clutch, bearing in mind that the centrifugal force increases with the square of the speed.

The engine may be accelerated above the high idle R. P. M. and the clutch centrifugally engaged against the retractor springs 30 and the spring 47 and upon rotation of the clutch shaft 6 the pump becomes effective and the liquid is pumped into the cylinder. At this time the spring 47 may be only partially collapsed and yet the clutch is fully engaged centrifugally. As the oil enters the cylinder it pushes the piston up against the stop shoulder 48. The spring 47 is preferably of lower resistance than the combined springs 63 and the area of the piston is preferably larger than the area of the end of the sleeve 36. When the piston strikes shoulder 48 the piston and the sleeve function as a piston head and the piston and sleeve shift to the left to the position shown in Fig. 2 in order that the clutch be hydraulically supplemented. In this action the bracket 60 moves away from the cam surface 72 and the springs 63 are flexed. However, upon deceleration of the engine to its high idle speed or to a lower speed, the parts return to a position shown in Fig. 3. As soon as the engine is warmed up so that it operates normally the control yoke 70 is pushed into the dotted line position shown in Fig. 6 so that the parts are relatively positioned as shown in Fig. 1.

The rotary adjustment of the sleeve takes care of the wear of the clutch facings. It will be noted that the sleeve can be urged, in the clutch supplementing action, until the cam faces 81 strike the studs 80. As the facings wear, however, the position of the lever tips, in full clutch engagement, gradually shifts to the left as Fig. 2 is viewed so that it is necessary to also shift the sleeve and piston further to the left. By rotating the sleeve through the means of the adjusting nuts 88, lower portions of the inclined faces 81 contact with the studs. There is enough play in the end couplings for the rod 87 for the axial shift of the sleeve and to this end the nut 88 and the seat may be partially spherically formed.

I claim:

1. In combination, a centrifugal clutch for use between an internal combustion engine and a driven member, said clutch having a centrifugally unbalanced weight system and retractor spring means coordinated so that the clutch is disengaged at normal engine idling speeds and engages and disengages as the engine is accelerated and decelerated, auxiliary clutch retractor spring means, means operatively connecting the auxiliary retractor spring means to the weight system, and control means for conditioning the connecting means to selectively render the auxiliary retractor spring means effective and ineffective, whereby when effective, the retractor spring means and the auxiliary retractor spring means act together to maintain the clutch disengaged at a relatively high engine idling speed.

2. In combination, a centrifugal clutch for use between an internal combustion engine and a driven member, said clutch having a centrifugally unbalanced weight system and retractor spring means coordinated so that the clutch is disengaged at normal engine idling speeds and engages and disengages as the engine is accelerated and decelerated, the centrifugally unbalanced weight system comprising a plurality of levers with radially inwardly disposed lever tips, auxiliary retractor spring means, means operatively connecting the auxiliary retractor spring means to the radially inward tips of the levers and control means for conditioning the connecting means to selectively render the auxiliary retractor spring means effective and ineffective, whereby when effective, the retractor spring means and the auxiliary retractor spring means act together to maintain the clutch disengaged at relatively high engine idling speeds.

3. In combination, a centrifugal clutch for use between an internal combustion engine and a driven member, said clutch having a centrifugally unbalanced weight system and retractor spring means coordinated so that the clutch is disengaged at normal engine idling speeds and engages and disengages as the engine is accelerated and decelerated, said centrifugally unbalanced weight system comprising levers with radially inwardly disposed tips, an axially disposed auxiliary retractor spring means, means operatively connecting the auxiliary retractor spring means with the lever tips and control means for conditioning the connecting means for selectively rendering the auxiliary retractor spring means effective and ineffective, whereby when effective, the retractor spring means and the auxiliary retractor spring means act together to maintain the clutch disengaged at relatively high engine idling speeds.

4. In combination, a centrifugal clutch for use between an internal combustion engine and a driven member, said clutch having a centrifugally unbalanced weight system and retractor spring means coordinated so that the clutch is disengaged at normal engine idling speeds and engages and disengages as the engine is accelerated and decelerated, said centrifugally unbalanced weight system comprising levers having radially inwardly disposed tips, an axially disposed auxiliary retractor spring, means operatively associating the auxiliary spring with the lever tips including an axially shiftable element acted upon by the auxiliary spring, a reaction element for the auxiliary spring and control means for shifting the axial position of the reaction element to selectively render the auxiliary retractor spring means effective and ineffective, whereby when effective, the auxiliary retractor spring acts together with the retractor springs and through the levers to maintain the clutch disengaged at relatively high engine idling speeds.

5. In combination, a centrifugal clutch for use between an internal combustion engine and a driven member, said clutch having a centrifugally unbalanced weight system and retractor spring means coordinated so that the clutch is disengaged at normal engine idling speeds and engages and disengages as the engine is accelerated and decelerated, said centrifugally unbalanced weight system including clutch levers with radially inwardly disposed tips, an axially shiftable piston, a channel ring in which the lever tips are disposed, a cylinder for the piston including a sleeve, auxiliary clutch retractor spring means between the sleeve and the piston, means driven by the clutch for pumping liquid into the cylinder to shift the piston in one direction so that one wall of the channel may engage the lever tips to supplement clutch packing pressure, and control means for shifting the position of the sleeve to selectively render the auxiliary spring effective and ineffective, the opposite side of the channel cooperating with the lever tips when the auxiliary spring is effective, whereby the auxiliary spring and the retractor spring means act together to maintain the clutch disengaged at relatively high engine idling speeds.

6. In combination, a centrifugal clutch for use between an internal combustion engine and a driven member, said clutch having a centrifugally unbalanced weight system and retractor spring means coordinated so that the clutch is disengaged at normal engine idling speeds and engages and disengages as the engine is accelerated and decelerated, said centrifugally unbalanced weight system including clutch levers with radially inwardly disposed tips, an axially shiftable piston, a channel ring in which the lever tips are disposed, a cylinder for the piston including a sleeve, auxiliary clutch retractor spring means between the sleeve and the piston, means driven by the clutch for pumping liquid into the cylinder to shift the piston in one direction so that one wall of the channel may engage the lever tips to supplement clutch packing pressure, and control means for shifting the position of the sleeve to selectively render the auxiliary spring effective and ineffective, the opposite side of the channel cooperating with the lever tips when the auxiliary spring is effective, whereby the auxiliary spring and the retractor spring means act together to maintain the clutch disengaged at relatively high engine idling speeds, said channel having a width, such that the lever tips have a movement therein adequate for providing full clutch engagement by centrifugal force when the auxiliary retractor spring means is ineffective.

7. In combination, a centrifugal clutch for use between an internal combustion engine and a driven member, said clutch having a centrifugally unbalanced weight system and retractor spring means coordinated so that the clutch is disengaged at normal engine idling speeds and engages and disengages as the engine is accelerated and decelerated, said centrifugally unbalanced weight system including clutch levers with radially inwardly disposed tips, a channel shaped ring in which the lever tips are disposed, auxiliary clutch retractor spring means acting upon the channel, control means effective upon the channel to position one wall thereof adjacent the lever tips for movement of the levers relative to the channel for clutch engagement under centrifugal action and for selectively positioning the other wall of the channel so as to render the auxiliary retractor spring means effective whereby to maintain the clutch disengaged at relatively high engine idling speeds.

8. In combination, a centrifugal clutch for use between an internal combustion engine and a driven member, said clutch having a centrifugally unbalanced weight system and retractor spring means coordinated so that the clutch is disengaged at normal engine idling speeds and engages and disengages as the engine is accelerated and decelerated, said centrifugally unbalanced weight system including clutch levers with radially inwardly disposed tips, a channel-shaped ring in which the lever tips are disposed, auxiliary clutch retractor spring means acting upon the channel, control means effective upon the channel to position one wall thereof adjacent the lever tips for movement of the levers relative to the channel for clutch engagement under centrifugal action and for selectively positioning the other wall of the channel so as to render the auxiliary retractor spring means effective whereby to maintain the clutch disengaged at relatively high engine idling speeds, and means driven by the clutch and operative to shift the channel and apply force to the lever tips to supplement the clutch packing pressure.

9. In combination, a centrifugal clutch for use between an internal combustion engine and a driven member, said clutch having a centrifugally unbalanced weight system and retractor spring means coordinated so that the clutch is disengaged at normal engine idling speeds and engages and disengages as the engine is accelerated and decelerated, the centrifugally unbalanced weight system including clutch levers with radially inwardly disposed lever tips, a cylinder, a sleeve slidable in the cylinder, a piston slidable in the sleeve, an auxiliary clutch retractor spring between the sleeve and the piston, a channel-shaped ring carried by the piston within which the lever tips are disposed, the channel having a width sufficient to provide lever movement for engagement and disengagement of the clutch centrifugally without axial movement of the channel, control means for selectively positioning the sleeve and thereby shift the channel to dispose elected walls of the channel adjacent the lever tips, to render the auxiliary spring effective and ineffective, and means operated by the clutch for pumping liquid into the cylinder for shift of the piston to apply supplementing clutch packing pressure to the levers.

10. In combination, a centrifugal clutch for use between an internal combustion engine and a driven member, said clutch having a centrifugally unbalanced weight system and retractor spring means coordinated so that the clutch is disengaged at normal engine idling speeds and engages and disengages as the engine is accelerated and decelerated, the centrifugally unbalanced weight system including clutch levers with radially inwardly disposed lever tips, a cylinder, a sleeve slidable in the cylinder, a piston slidable in the sleeve, an auxiliary clutch retractor spring between the sleeve and the piston, a channel-shaped ring carried by the piston within which the lever tips are disposed, the channel having a width sufficient to provide lever movement for engagement and disengagement of the clutch centrifugally without axial movement of the channel, control means comprising a shiftable yoke having a cam engagement with the sleeve and operable to selectively position the sleeve to bring opposite sides of the channel into cooperating relationship with the lever tips and thereby render the auxiliary spring effective and ineffective, and means driven by the clutch for pumping liquid into the cylinder to shift the piston and thereby apply supplementing clutch packing pressure to the levers.

11. In combination, a centrifugal clutch for use between an internal combustion engine and a driven member, said clutch having a centrifugally unbalanced weight system and retractor spring means coordinated so that the clutch is disengaged at normal engine idling speeds and engages and disengages as the engine is accelerated and decelerated, the centrifugally unbalanced weight system comprising clutch levers with radially inward tips, an axially shiftable element having a channel ring in which the lever tips are disposed, a reaction element, an auxiliary clutch retractor spring disposed between the reaction element and the shiftable element, control means in the form of a shiftable yoke, spring means normally positioning the reaction element, the yoke and reaction element having interengaging cam faces, said yoke being shiftable to selectively position the reaction element to render the auxiliary spring means effective and ineffective, whereby when effective, the auxiliary spring means acts together with the retractor spring means to hold the clutch disengaged at relatively high engine idling speeds.

12. In combination, a centrifugal clutch for use between an internal combustion engine and a driven member, said clutch having a centrifugally unbalanced weight system and retractor spring means coordinated so that the clutch is disengaged at normal engine idling speeds and engages and disengages as the engine is accelerated and decelerated, the centrifugally unbalanced weight system comprising clutch levers with radially inward tips, an axially shiftable element having a channel ring in which the lever tips are disposed, a reaction element, an auxiliary clutch retractor spring disposed between the reaction element and the shiftable element, control means in the form of a shiftable yoke, spring means normally positioning the reaction element, the yoke and reaction element having interengaging cam faces, said yoke being shiftable to selectively position the reaction element to render the auxiliary spring means effective and ineffective, whereby when effective, the auxiliary spring means acts together with the retractor spring means to hold the clutch disengaged at relatively high engine idling speeds, stop means for the reaction element including fixed abutments and inclined faces on the reaction element, and means for rotatably adjusting the reaction element to vary the stopping position thereof to accommodate for clutch facing wear.

ERNEST E. WEMP.